O. SCHUETTE.
Photometers.

No. 165,764. Patented July 20, 1875.

Witnesses:
D. H. Brandon
P. Parbury

Inventor:
Otto Schuette

M. PETERS, PHOTO-LITHOGRAPHER, WASHINGTON, D. C.

UNITED STATES PATENT OFFICE.

OTTO SCHUETTE, OF PARIS, FRANCE.

IMPROVEMENT IN PHOTOMETERS.

Specification forming part of Letters Patent No. 165,764, dated July 20, 1875; application filed June 16, 1875.

*To all whom it may concern:*

Be it known that I, OTTO SCHUETTE, engineer, of 13 rue Gaillon, Paris, France, have invented certain new and useful Improvements in Photometers; and I hereby declare that the following, taken in connection with the drawings which accompany and form part of this specification, is a description of my invention sufficient to enable those skilled in the art to practice it.

The object of my invention is to produce a simple pocket instrument for measuring light instantaneously, without any previous preparation or subsequent calculation. It consists in interposing between the eye and the light to be measured a series of sheets of partially transparent matter, such as paper of gradually and regularly increasing thickness, each layer being marked with a consecutive number, so as to form an ascending scale, increasing in the same ratio as the thickness of material interposed. For the highest figure of this scale I take a standard light, artificial or natural, which will correspond with the greatest thickness of obturating material through which such figure can be read, and for the lowest figure darkness, or such absence of light that the said figure cannot be read through a material of the thinnest description.

For one form of instrument I make use of circular layers of paper, placed one over the other to the required thickness, the bottom one being a complete disk while I cut out sections of gradually increasing surface on each successive sheet, so that the upper or last one consists in a mere angular strip of the same section as the amount cut out of the second sheet. I call this assemblage of partially transparent matter a photometric disk, and I mark a consecutive figure on each section, thus forming a photometric scale, the lowest figure being marked on the visible section of the bottom single sheet, and the highest figure on the upper section or layer constituting the greatest thickness. I place this disk in one extremity of a small instrument, provided, if requisite, with a lens and a focusing-tube, and so arranged that when the other extremity is placed to the eye each section on the disk being rotated will be brought singly and successively to sight.

In order that my invention be clearly understood, I will proceed to describe it conjointly with the six figures of the accompanying drawing, of which—

Figure 2:
Figure 1:
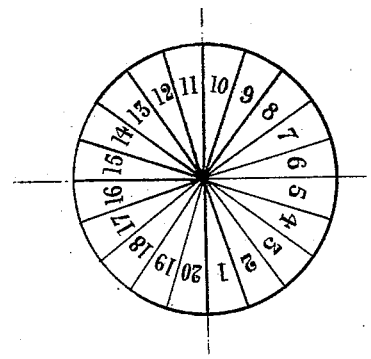
Figure 3:
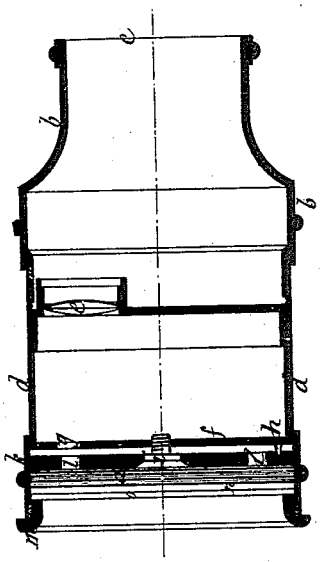
Figure 5:
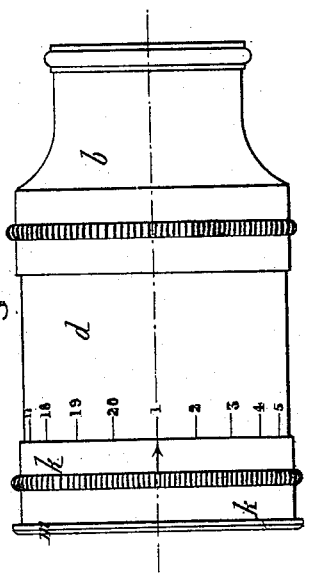
Figure 4:
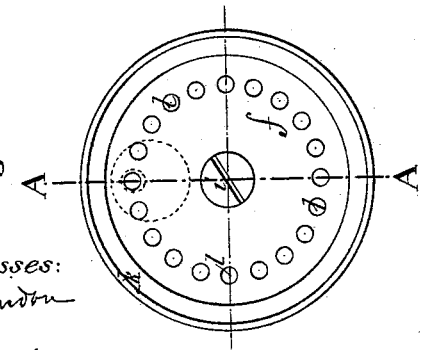
Figure 6:
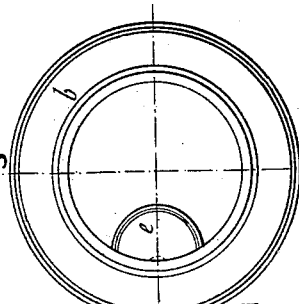

Figure 1 is a front elevation, and Fig. 2 a lateral elevation, of my photometric disk; Fig. 3, a longitudinal elevation of my instrument in section through A A, Fig. 4; Fig. 4, a back elevation of the same; Fig. 5, an outside longitudinal elevation, and Fig. 6 a front elevation of the same.

My photometric disk (see Figs. 1 and 2) is composed of any appropriate number, say twenty or more successive layers of partially transparent material, such as paper, numbered from 1 to 20. The lower layer (No. 1) is a complete circle; from the second (No. 2) is cut out a section corresponding to the angular part, 1, remaining in sight. The angular part or section, marked 2, is thus composed of two thicknesses of material, and so on to No. 20, which latter merely consists in an angular strip of the dimensions indicated, and forms the last layer of the maximum thickness of the disk—viz, twenty layers. I place this photometric disk, as shown at $a$, in my photometer, which is composed of a tube, $b$, open at one extremity, $c$, and provided at its other extremity with a tube, $d$, containing a lens, $e$, a bottom piece, $f$, pierced with a hole, $g$, and in which is inserted a pin, $h$. To this bottom piece $f$ is attached, by means of a screw, $i$, the rotating cap $k$, pierced with twenty holes, $l$, and provided with a screw-ring, $m$, for tightening the disk $a$ by means of the glasses $n$ $o$ in the cap. A series of twenty small cavities is made under the path of the pin $h$, such cavities being placed to coincide with the apertures $l$, and by reason of the elasticity of $f$ these cavities constitute so many stopping-points at which the cap is brought to rest, corresponding with the different thicknesses of the disk $a$.

When in use, this instrument must be applied at $c$ to one eye, so as to exclude all extraneous light, the other eye being closed, and directed toward the light to be measured. The cap $k$, containing the photometric disk $a$, is then rotated until there be interposed between the eye and the light to be measured such a thickness of the material that the corresponding number thereon can only just be read. If this number be 10, for instance, on a scale graduated from 1 to 20, it will indicate that the light measured is one-half of the standard. If, while in this position, the instrument is directed to an object less exposed to light, the said number 10 will no longer be visible, and the cap will have to be turned back in the direction of the sections of lesser thickness until a number is presented which can just be read, which number, corresponding to a lesser thickness of material, indicates the exact ratio of the light with respect to the former observation. If, on the contrary, the instrument is directed toward an object better lighted than in the first case, then the figure 10 will be too glaring, and the cap will have to be rotated in the contrary direction until such a number is presented that it can only just be read. For greater convenience I mark outside the tube $d$ a scale corresponding to the sections of the disk, as seen in Fig. 5, and on the cap $k$ an arrow, so that the readings obtained internally are recorded or checked externally in my photometer.

In the foregoing specification I have referred to the number being marked or printed on the corresponding sections of the disk; they can, however, if preferred, be marked on separate disk of flat paper, or each on separate pieces of paper stuck over the respective holes $l$.

I claim as my invention—

1. The photometric disk $a$, or its equivalent, constructed with a graduated series of varying degrees of transparency, and with its numbers corresponding with its various thicknesses.

2. The instrument, or its equivalent, composed of the stationary parts $b\ d\ c\ f$ and the rotating disk $a$, with or without a focusing-tube.

3. The rotating cap $k$, provided with holes $l$, in combination with the piece $f$, as and for the purpose set forth.

OTTO SCHUETTE.

Witnesses:
P. PARBURY,
ROBT. M. HOOPER.